United States Patent
Kumar et al.

(10) Patent No.: US 10,240,627 B2
(45) Date of Patent: Mar. 26, 2019

(54) SMART STUD-NUT ASSEMBLY

(71) Applicant: Wipro Limited, Bangalore (IN)

(72) Inventors: Vijay Kumar, Bangalore (IN); Thomas Chittakattu Ninan, Kannur District (IN); Balaji Sunil Kumar, Bengaluru (IN)

(73) Assignee: Wipro Limited, Bangalore (IN)

(*) Notice: Subject to any disclaimer, the term of this patent is extended or adjusted under 35 U.S.C. 154(b) by 193 days.

(21) Appl. No.: 15/450,950

(22) Filed: Mar. 6, 2017

(65) Prior Publication Data

US 2018/0202480 A1  Jul. 19, 2018

(30) Foreign Application Priority Data

Jan. 19, 2017 (IN) .............................. 201741002174

(51) Int. Cl.

| | |
|---|---|
| *F16B 31/02* | (2006.01) |
| *B60B 3/16* | (2006.01) |
| *G01B 7/14* | (2006.01) |
| *F16B 41/00* | (2006.01) |
| *F16B 31/00* | (2006.01) |
| *H01C 10/40* | (2006.01) |

(52) U.S. Cl.
CPC ................. *F16B 31/02* (2013.01); *B60B 3/16* (2013.01); *F16B 41/005* (2013.01); *G01B 7/148* (2013.01); *F16B 31/00* (2013.01); *H01C 10/40* (2013.01)

(58) Field of Classification Search
CPC ........ F16B 1/0071; F16B 31/00; F16B 31/02; F16B 33/00; F16B 41/005; B60B 3/16
USPC ............................................. 411/8, 14, 366.1
See application file for complete search history.

(56) References Cited

U.S. PATENT DOCUMENTS

| | | | | |
|---|---|---|---|---|
| 2,503,141 | A * | 4/1950 | Stone .................... | F16B 31/025 340/668 |
| 2,600,029 | A * | 6/1952 | Stone .................... | F16B 31/025 338/2 |
| 4,333,351 | A * | 6/1982 | Bickford .................. | G01L 5/24 411/14 |
| 6,204,771 | B1 * | 3/2001 | Ceney .................... | F16B 31/025 250/559.19 |
| 7,973,671 | B2 * | 7/2011 | Cloutier .................... | F16D 9/06 116/200 |
| 7,994,901 | B2 | 8/2011 | Malis et al. | |
| 10,100,872 | B1 * | 10/2018 | Rode ....................... | F16B 39/12 |
| 2008/0252137 | A1 * | 10/2008 | Necaise .................... | B60B 3/16 301/108.4 |

(Continued)

*Primary Examiner* — Roberta S Delisle
(74) *Attorney, Agent, or Firm* — LeClairRyan PLLC

(57) ABSTRACT

The present disclosure discloses a fastener assembly. The assembly comprises a stud having a head portion connectable to an actuator, and a shank extending from the head portion. At least a portion of the shank comprises threads, and an insulating material extends on the threads. A resistor module comprising one or more resistors is configured on the insulating material. One end of the one or more resistors is connectable to a power source, and other end of the one or more resistors is connectable to the power source through a nut engageable with the threads. A movement of the stud relative to the nut varies net resistance across the resistor module. The variation of net resistance across the resistor module may be used to determine position of the nut relative to the stud.

14 Claims, 7 Drawing Sheets

(56) References Cited

U.S. PATENT DOCUMENTS

| | | | |
|---|---|---|---|
| 2008/0253858 A1* | 10/2008 | Hsieh | F16B 31/02 411/14 |
| 2013/0049952 A1 | 2/2013 | Schnare | |
| 2013/0088069 A1 | 4/2013 | Dooner | |
| 2015/0063941 A1* | 3/2015 | Hsieh | F16B 31/025 411/14 |
| 2015/0198195 A1* | 7/2015 | Peltz | G01N 21/952 29/407.02 |
| 2015/0247520 A1* | 9/2015 | Hsieh | F16B 31/02 411/14 |
| 2015/0247521 A1* | 9/2015 | Hsieh | H04Q 9/00 411/8 |

* cited by examiner

SMART STUD-NUT ASSEMBLY

This application claims the benefit of Indian Patent Application Serial No. 201741002174 filed Jan. 19, 2017, which is hereby incorporated by reference in its entirety.

FIELD

Present disclosure generally relates to mechanical joining assemblies. Particularly, but not exclusively, the present disclosure relates to a fastener assembly. Further, embodiments of the present disclosure disclose a smart fastener assembly in which a stud may be automatically adjusted relative to a nut.

BACKGROUND

Joining is a process of connecting two or more components together either permanently or temporarily. Conventionally, the components are joined using thermal joining or mechanical joining techniques. Generally, thermal joining is used to form a permanent joint between components, and the mechanical joining may be used to join the components either permanently or temporarily. Fasteners like bolt and nut assembly, screws, pins, rivets and the like are used to mechanically join two or more members or structural components. Conventionally, a hole or a bore is machined through the components which are to be joined, and the fasteners are inserted through the hole or the bore to secure the components with one another. For example, when two plates abutting with each are to be held together, a hole or a bore is formed through depths of both the plates, and a fastener, like a pin or a rivet is inserted in the through-hole. However, when a bolt nut assembly is employed, the elongated portion of the bolt resides in the through-hole, and the nut is tightened on a free end of the elongated portion of the bolt. The nut so tightened will secure the abutting plates with each other. Further, the nature of joint between the components which are joined depends on the type of fastener used. A bolt and nut assembly may be regarded as a temporary fastening arrangement, since the nut can be unfastened to disassemble or separate one or more components from the rest.

Generally, a bolt includes a head portion and an elongated cylindrical body called a shank. The exterior of the shank may be provided with number of ridges called threads. On the other hand, a nut may have a central bore with internal threads, such that the threaded shank may reside and move inside the threaded bore of the nut. Either the stud or the nut is imparted with torque to fasten or unfasten. Fastening involves displacing the nut towards the head of the bolt so that the components to be fastened are secured to one another. While unfastening involves displacing the nut away from bolt head. Due to mechanical contact between the nut and the bolt, there are possibilities that with progress of time, the nut slowly starts unfastening from the bolt i.e. the nut gets displaced away from the bolt head. Various factors such as thermal expansion or contraction, vibrations, wear, warping, shrinkage, insufficient torque during fastening, etc., take part in self-unfastening of the nut relative to bolt. The phenomenon is referred to as "self-loosening". The self-loosening phenomenon influenced by various factors mentioned above may lead to undesirable outcomes, such as separation of the heavy mechanical and structural components, leading to complications. One example of such a scenario includes sudden detachment of wheel from vehicle wheel hub, which is undesirable. In this case, the wheel rim containing the tyre may be fastened to the wheel hub, with the wheel hub containing plurality of bolts, and wheel rim containing nuts which can be fastened onto the bolts. When the vehicle propels, the wheel assembly comprising wheel rim and wheel hub is subjected to forces, torques and vibrations. These forces may eventually lead to self-loosening of one or more nuts from the bolts, consequently resulting in loosening of wheel rim from the hub. Another limitation is that in most of the cases, fastening is done manually i.e. the nut is fastened onto the bolt by applying torque manually using conventionally known tools, machine tools or devices. The manual fastening would not provide equal torsion between nuts and their respective bolts. With the progress of time, the nuts which were not torqued appropriately may undergo self-loosening, resulting in improper alignment between the components which are fastened. This in turn may result in transmission losses, reduction in transmission efficiency, deformations of mechanical members or even untimely failure of the components.

Several techniques have been implemented in the past to remedy self-loosening of the nut from the bolt, or vice-versa. One such technique utilizes a device which determines position of one component with respect to the other, for example, two or more flanges. The components are held together by a plurality of fasteners. The device is accommodated in one of the components. Whenever there is self-loosening between the fasteners, the device detects displacement of one component relative to adjacent component, and accordingly, the user may be alerted. The user, upon receiving the alert, may be prompted to manually fasten the nut relative to the bolt to secure the components. Another such fastening arrangement utilizes a fluid filled in a cavity inside the bolt. Whenever the nut is fully torqued with respect to bolt, the fluidic forces are sensed by sensors, and corresponding to the signals, user is alerted. The user may then manually torque the nut relative to the bolt for fastening. A limitation with the techniques described above may include lack of reliability since various mechanical factors are involved in determining the self-loosening. Also, a compromise is made in accuracy at which the self-loosening is determined.

The present disclosure is directed to address one or more problems as discussed above.

SUMMARY

One or more shortcomings of the conventional assemblies are overcome and additional advantages are provided through the present disclosure. Additional features and advantages are realized through the techniques of the present disclosure. Other embodiments and aspects of the disclosure are described in detail herein and are considered a part of the claimed disclosure.

In a non-limiting embodiment of the disclosure, there is provided a fastener assembly. The assembly comprises a stud having a head portion connectable to an actuator, and a shank extending from the head portion. At least a portion of the shank comprises threads, and an insulating material extends on the threads. A resistor module comprising one or more resistors is configured on the insulating material. One end of the one or more resistors is connectable to a power source, and other end of the one or more resistors is connectable to the power source through a nut engageable with the threads. A movement of the stud relative to the nut varies net resistance across the resistor module.

In an embodiment of the disclosure, there is provided a stud for a fastener assembly. The stud comprises a first casing and a second casing, each accommodating at least a portion of circumference of the shank on the insulating material with a predetermined gap. A resistor module comprising one or more resistors is configured in between the insulating material and the first and second casings.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments, and, together with the description, serve to explain the disclosed principles. The same numbers are used throughout the figures to reference like features and components. Some embodiments of system and/or methods in accordance with embodiments of the present subject matter are now described, by way of example only, and with reference to the accompanying figures, in which.

Figure 1:
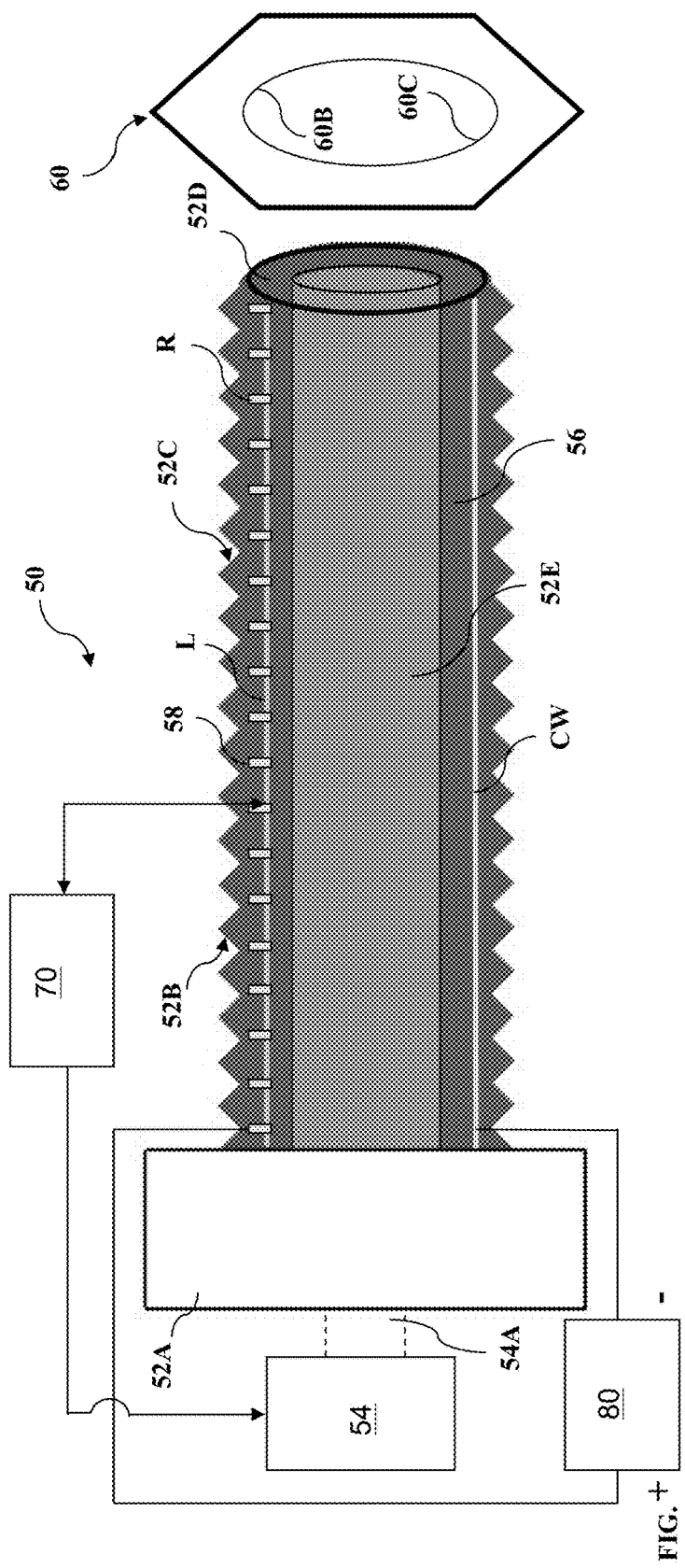
FIG. 1 illustrates a sectional perspective view of a fastener assembly, in accordance with some embodiments of the present disclosure.

It should be appreciated by those skilled in the art that any block diagrams herein represent conceptual views of illustrative device embodying the principles of the present subject matter. Similarly, it will be appreciated that any flow charts, flow diagrams, state transition diagrams, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular form disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device, assembly or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure discloses a fastener assembly comprising a stud, having a head portion and a shank extending from the head portion. The head portion is connectable to an actuator such that the stud may be rotated relative to a nut. The shank is configured with threads on at least a portion, and the threads may extend from a free end of the stud on the at least a portion of the shank. The threaded portion of the shank may be insulated with an insulating material. In an embodiment of the disclosure, the insulating material may be provided in the stud such that it may extend on the threads of the stud. Further, the fastener assembly comprises a resistor module comprising one or more resistors configured on the insulating material. The resistor module is configured such that one of the ends of the resistor module is connected to a power source, and other end is connectable to the power source through a nut which is engageable with the stud. The nut comprises threads which are engageable with the threads of the stud. In an embodiment of the present disclosure, the threads in the nut may be made of conducting material engageable with corresponding threads present on the shank. When the stud is engaged with the nut and moved relative to the nut, net resistance across the resistor module varies, which may be used to determine position of the nut on the shank.

In an embodiment of the present disclosure, the nut may be fixed to one of the components to be joined, and the head portion of the stud may be rotated by the actuator to move the stud relative to nut. The movement of the stud relative to nut results either in fastening or unfastening of the stud with respect to nut. In an embodiment of the present disclosure, the net resistance of the resistor module comprising one or more resistors is maximum at the free end of the stud, the net resistance decreases along a length of the stud towards the head portion.

In an embodiment of the present disclosure, the fastener assembly may be associated with a control unit which may be interfaced with the resistor module and the actuator. The control unit may be configured to receive a user input corresponding to at least one of fastening and unfastening from an input module, and accordingly operate the actuator to rotate the stud relative to the nut. Upon receiving the user input, the control unit may detect net resistance of the resistor module, and determine the current status of the assembly. The current status of the assembly will be compared by the control unit with the user input, and alert a user in case of faulty input. If the user input matches with the condition of current status, the control unit operates the actuator to move the stud in respective direction to carry-out fastening or unfastening operation. The control unit may be configured to monitor the net resistance and regulate the actuator if the net resistance matches with pre-set values.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a fastener assembly 50, in accordance with some embodiments of the present disclosure.

In an exemplary implementation as illustrated in FIG. 1, the fastener assembly 50 comprises a stud 52 having a head portion 52A and a threaded shank 52B, a nut 60, a resistor module 58 comprising a plurality of resistors R, and a power source 80.

As shown in FIG. 1, the fastener assembly 50 includes a stud 52 [alternatively referred to as "bolt" throughout the description] having a head portion 52A and an elongated portion extending from the head portion 52A, referred to as shank 52B. The elongated shank 52B of the stud 52 securely holds one or more components which are to be connected or affixed with each other. To achieve this, the shank 52B of the stud 52 may be inserted into a hole or a bore formed through the depths of the components to be joined. Upon insertion of the shank 52B, a nut 60, which may be regarded as counterpart of the stud 52, may be assembled and displaced over the shank 52B periphery towards the head portion 52A. The position of the nut 60 may be varied relative to the shank 52B to accomplish fastening and unfastening operations. The nut 60 comprises a through hole or a through bore 60B into which the shank 52B of the stud 52 may be passed. Thus, a portion of the shank 52B may reside inside the hole or bore 60B of the nut 60 when the nut 60 is assembled onto the stud 52. To guide and constrain relative movement of the nut 60 over the shank 52B of the stud 52, threads 52C are provided on outer periphery of the shank portion 52B of the stud 52, and such threads may be regarded as male threads. The nut 60 comprises counter-threads 60C, which may be referred to as female threads formed in an inner periphery of the hole or bore 60B of the nut 60. The threads 52C and 60C engage upon assembly of nut 60 over the shank 52B. In an embodiment of the present disclosure, threads 52C may be formed on at least a portion of the shank 52B. The "at least one portion" in this context refers to a portion along the length of the shank 52B extending from a free end 52D of the shank 52B. In another embodiment, the threads 52C may be present on entire length of the shank 52B. The shank 52B also comprises a free end 52D from which the nut 60 enters on the stud 52.

In an embodiment of the present disclosure, the head portion 52A of the stud 52 may be coupled to an actuator 54 [schematically illustrated] in FIG. 1. In an embodiment of the present disclosure, the actuator 54 may be a motor, including but not limited to an electric motor. The actuator 54 is configured to impart torque on the head portion 52A of the stud 52 to rotate the stud 52 in a predetermined direction i.e. clockwise or counter-clockwise. In an embodiment of the present disclosure, the actuator 54 may comprise of a shaft 54A which may be coupled to the head portion 52A of the stud 52. The rotary motion of the shaft 54A of the actuator 54 may be transmitted to rotate the stud 52. In an embodiment of the present disclosure, the shaft 54A of the actuator 54 may be coupled to the head portion 52A of the stud 52 through mechanical coupling means, including but not limited to coupling joints. Further, as stud-nut assembly involves both fastening and un-fastening, the actuator 54 may be configured to impart rotary movement to the head portion 52A in either direction i.e. clock-wise and counter-clockwise. In an embodiment of the present disclosure, the actuator 54 includes a DC motor, stepper motor or a servo-motor whose direction of rotation may be reversed based on inputs provided, among other forms of motors.

In an embodiment of the disclosure, the term "fastening" herein above and below refers to actuation of the head portion of the stud 52 towards the nut 60. In alternate terms, "fastening" refers to displacement of position of the nut 60 towards the head portion 52A of the stud 52, so that the components present between the head portion 52A and the nut 60 are secured against each other by said displacement. Fastening may be achieved by applying torque on the head portion 52A in first direction, for example, clockwise direction. On the other hand, "unfastening" refers to a condition where the nut 60 is displaced away from the head portion 52A. Unfastening may be accomplished by actuating the head portion 52A in a second direction which is opposite to first direction, i.e. counter-clockwise if first direction is clockwise. In an embodiment of the present disclosure, the actuator 54 may be coupled to the head portion 52A through a gearbox [not shown], which may be provided between the actuator 54 and the head portion 52A. The gearbox so provided may be configured to impart variable torque to the stud 52.

The fastener assembly 50 of the present disclosure is configured with smart features to detect the position of the nut 60 on the shank 52B, and automatically adjust the nut 60 position based on the user input and identification of current position of the nut. In one configuration, the fastener assembly 50 comprises an arrangement to determine position of the nut 60 on the shank 52B using the characteristic of resistance variation. In an embodiment of the present disclosure, an insulating material 56 is configured in the stud 52 along the threads 52C. The insulting material 56 extends along the length of the at least a portion of the shank 52B, and surrounds core portion 52E of the stud 52. In an embodiment of the present disclosure, the core portion 52E comprises of a conductive material like a metal, and insulting material may be made of material such as but not limiting to plastic. The insulating material 56 may be wrapped or wound around the core portion as depicted in FIG. 1. Further, at least a portion along the length of the stud 52 and at the threads 52C, a resistor module 58 may be provided to measure variation in resistance. The resistor module 58 may be configured on the insulating material 56 and may protrude through the threads 52C as depicted in FIG. 1. In an embodiment, the resistor module 58 may be embedded on the insulating material 56. The resistor module 58 includes a plurality of resistors R and resistor line L. The plurality of resistors R together with line L is collectively referred to as resistor module 58 henceforth in the detailed description. In an embodiment, the resistors R are connected in series i.e. connected end to end as depicted in FIG. 1. The resistors in series are connected by the common line L which extends further as a positive [or anode] terminal of a power source 80 [depicted with "+" symbol].

Now, referring again to FIG. 1, at least another portion along the length of the stud 52 may be configured with an electrical conductive line, such as a conductive wire CW. The conductive wire CW is also configured on the insulating material 56, and further extends as cathode terminal [depicted with "−" symbol]. In an embodiment, the polarities of resistor line L and conductive wire CW may be reversed i.e. resistor line L may extend as cathode and conductive wire CW may extend as anode. Since both resistor module 58 and conductive wire CW are separated or isolated by insulating material 56 in between, no electric current flows through them. In other words, the presence of insulating material 56 between the resistor module 58 and conductive wire CW renders the circuit open when the nut 60 is detached or separate from the stud 52. When the nut 60 is assembled on the stud 52 by placing it on free end 52D, the threads 60C of the nut 60 come in contact with resistor module 58 on one side and conductive wire CW on the other. The threads 60C of the nut 60 being electrically conductive, establish electrical contact between the resistor module 58 and the conductive wire CW. Thus, the nut 60 acts as electrical pathway between resistor module 58 and conductive wire L when it is assembled on the stud 52.

The circuit comprising the resistor module 58 gets closed and electric current flows when the nut 60 is accommodated on free end 52D of stud 52, and resistance gradually reduces as the nut 60 advances towards the head portion 52A. In an embodiment, when the nut 60 is present at the free end 52D of the stud 52, the closed circuit formed will have maximum net resistance i.e. effective resistance of all the resistors R will be maximum. As the nut 60 is fastened towards head portion 52A, the net resistance across the resistor module 58 decreases. Thus, net resistance across the resistor module 58 or the closed circuit varies with varying position of the nut 60 on the stud 52. Conversely, position of the nut 60 on the stud 52 may be identified by determining the variation in resistance across the resistor module 58. Further, when the stud 52 is actuated by the actuator 54 to perform fastening, the nut 60 may be displaced towards the head portion 52A, resulting in drop of net resistance across the resistor module 58. Similarly, during unfastening, nut 60 may be displaced away from head portion 52A causing an increase in net resistance across the resistor module 58. In an embodiment of the present disclosure, the conductive wire CW may be replaced by a resistor module 58, so that distinct resistor modules 58 are present along the stud 52 at distinct portions.

The assembly 50 is also associated with a control unit 70, which is interfaced with the resistor module 58 and the actuator 54. The control unit 70 may be configured to receive signals corresponding to net resistance value from the resistor module 58, and operate the actuator 54 to rotate the stud 52 relative to nut 60 based on net resistance value received. The rotation of stud 52 relative to nut 60 corresponding to net resistance across resistor module 58 allows the nut 60 be accurately positioned in torqued or tightened condition.

Figure 2:
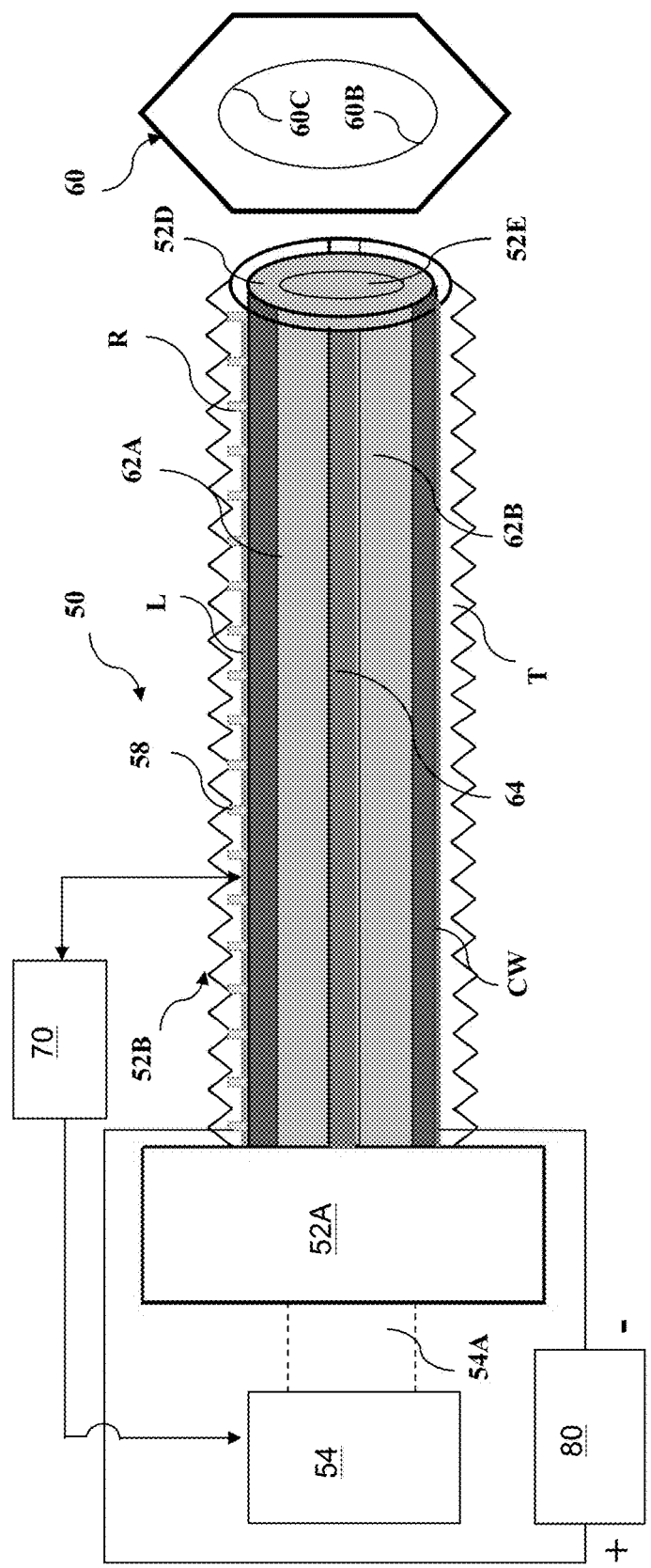
FIG. 2 illustrates a sectional perspective view of a fastener assembly with first and second casings, in accordance with some embodiments of the present disclosure.

FIG. 2 shows an exemplary representation of the fastener assembly 50 in which the stud 52 is configured with a first casing 62A and a second casing 62B, in accordance with some embodiments of the present disclosure.

The fastener assembly 50, as depicted in FIG. 2, has a core portion 52E of stud 52 and insulating material 56 surrounding the core portion 52E, similar to fastener assembly 50 FIG. 1. In addition, a first casing 62A and a second casing 62B are accommodated over the insulating material 56. The first and second casings 62A, 62B are separated by a predetermined gap 64 which may be an air gap or may be filled with the insulating material 56. In this way, the first and the second casings 62A, 62B are electrically isolated or separated from each other. The resistor module 58 is configured either in first casing 62A or in second casing 62B or in both first and second casing 62A, 62B. In all three cases, the resistor module 58 is configured such that it extends along the threads 52C for at least a portion or entire length of the stud 52. In an embodiment as depicted in FIG. 2, resistor module 58 may be configured in the first casing 62A at the threads 52C, and second casing 62B is configured with a conductive wire CW. The first and second casings 62A, 62B are made of metallic material, and may be configured to enclose the resistor module and/or conductive wires CW on the insulating material. The head portion 52A may be coupled to the actuator 54. The resistor module 58 and the conductive wire CW may be connected to terminals of power source 80, including but not limiting to a battery. When the nut 60 is placed on the shank 52B of the stud 52, the threads 60C of the nut 60 establish electric pathway between resistor module 58 and conductive wire, owing to conductive nature of the threads 60C. Upon fastening the head portion 52A towards the nut 60, the net resistance across resistor module 58 drops, and upon unfastening the head portion 52A away from nut 60, the net resistance increases. In an embodiment, the net resistance is maximum at free end 52D of the stud 52, and the net resistance is least at the shank end proximal to, or adjoining the head portion 52A. The control unit 70 is interfaced with resistor module 58 and actuator 54 to vary the position of the nut 60 relative to stud 52 based on variation in net resistance, as described in previous paragraphs.

Figure 3A:
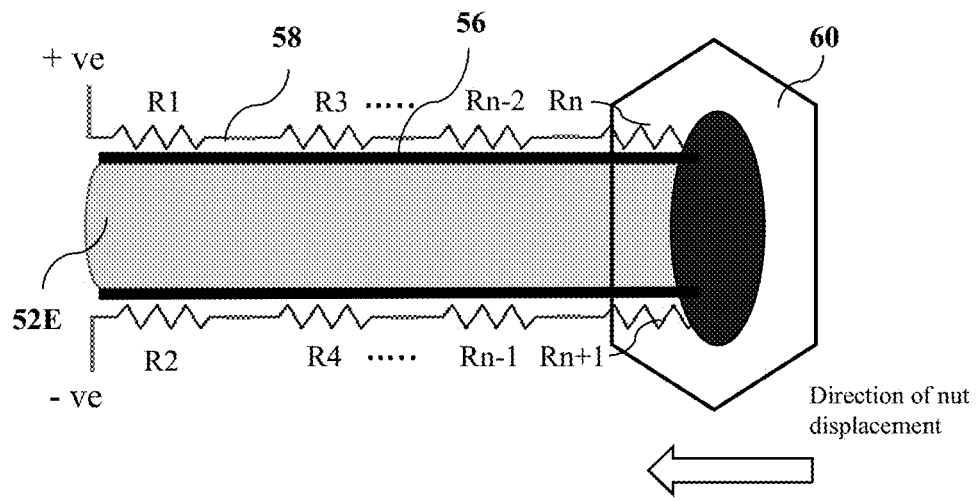
FIGS. 3A and 3B illustrate schematic views of a fastener assembly with the nut in torqued and un-torqued conditions respectively, in accordance with some embodiments of the present disclosure.
Figure 3B:
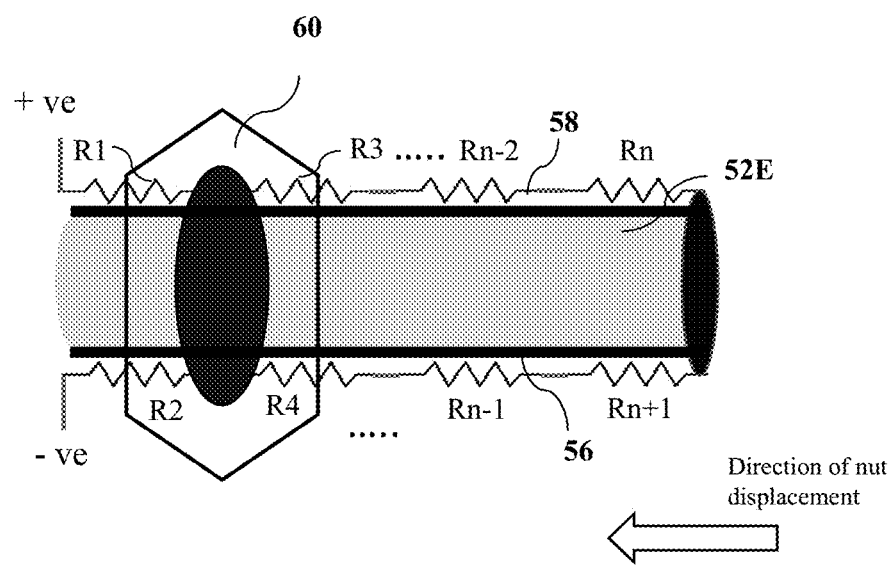

FIGS. 3A and 3B are exemplary schematic representations of fastener assembly 50 which illustrate setting of nut 60 position relative to stud 52 based on variation of net resistance across the resistor module 58, in accordance with some embodiments of the present disclosure.

As illustrated in FIGS. 3A and 3B, the resistor modules 58 containing resistors R may be configured at two distinct portions along the length of the stud 52. As depicted in FIG. 3A, the resistor module 58 may comprise of one set of resistors R placed on a portion of the shank 52B, wherein, resistors R in the set are connected in series. The stud is configured such that the nut 60 may be engageable with free end 52D of the stud 52, where the circuit gets closed and electric current flows between resistor modules 58 through the nut 60 from positive to negative terminal. In one configuration, net resistance may be configured to be maximum when the nut 60 is present at free end 52D, and therefore, maximum resistance will be offered to flow of current. The maximum resistance value is input to the control unit 70, and accordingly, control unit 70 decides that the nut 60 is in unfastened condition with respect to stud 52. Based on this, the control unit 70 operates the actuator 54 to rotate the stud 52 relative to nut 60. Precisely, the stud 52 is rotated such that the head portion 52A is moved towards the nut 60. Since nut will be in fixed state, the rotation of the stud relative to the nut 60 changes the position of the nut 60 on the shank 52, whereby the nut 60 gets displaced towards the head portion 52A. The change in position of the nut 60 over the threaded shank 52B will result in variation of resistance across the resistor module 58. For example, when nut 60 is moved between resistors R1 and R3 as depicted in FIG. 3B, net resistance across resistor module 58 may be R1 plus R2, with all the other resistance values being subtracted. A further rotation of stud 52 by actuator 54 causes further displacement of nut 60 towards head portion 52A, and based on net resistance feedback to control unit 70, the control unit 70 continues to rotate the actuator 54 until nut 60 reaches the position of minimum net resistance. When net resistance reaches least or minimum value, the nut 60 is considered to be in fully torqued or fully fastened condition. Further, when the net resistance reaches minimum or least, the control unit 70 may be prompted to stop further rotation of actuator 54 to prevent over-fastening.

Figure 4:
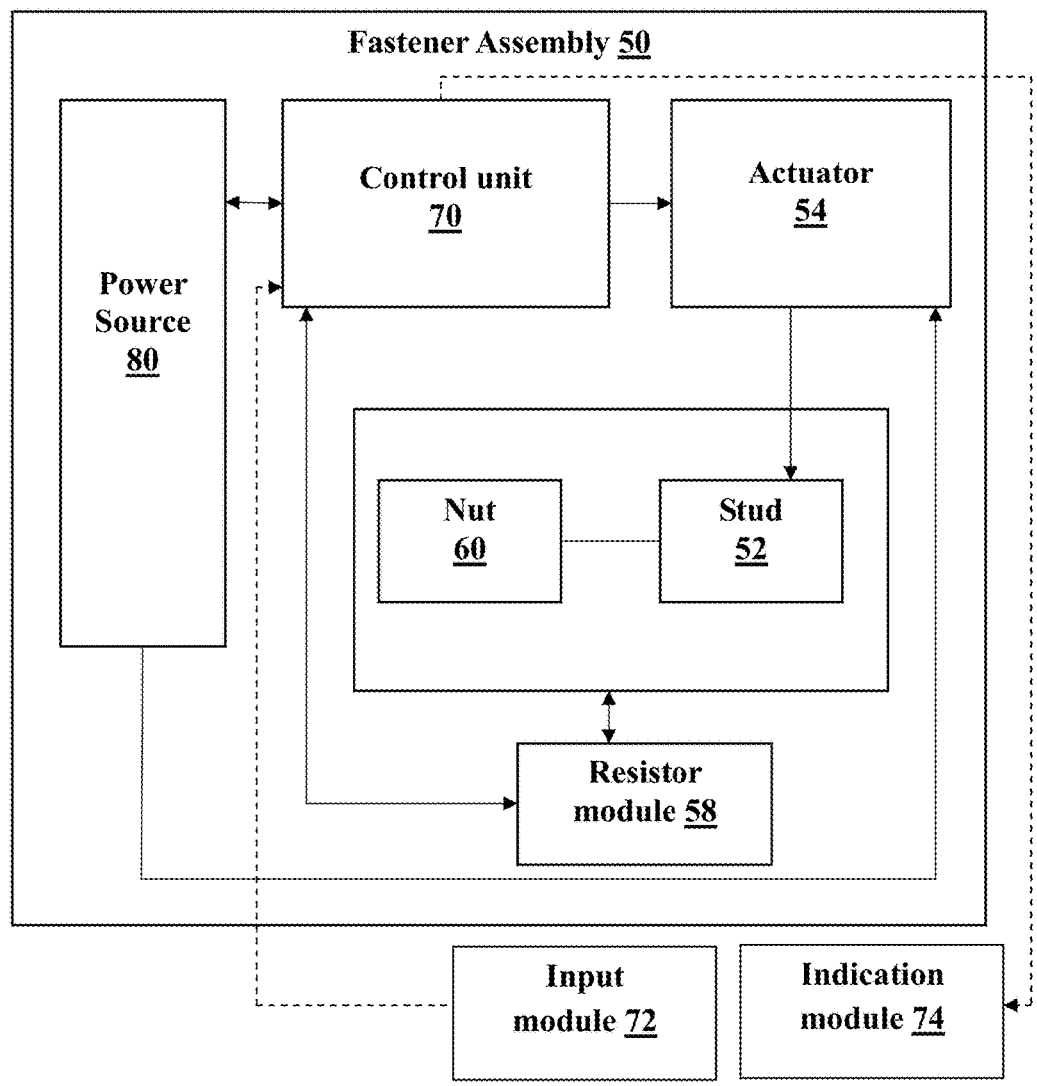
FIG. 4 illustrates a block diagram of a fastener of FIG. 1, in accordance with some embodiments of the present disclosure.

FIG. 4 illustrates a block diagram of a fastener assembly 50 with a control unit 70 interfaced with resistor module 58 and actuator 54, in accordance with some embodiments of the present disclosure. As shown in FIG. 4, the fastener assembly 50 may be associated with a power source 80. In an embodiment of the disclosure, the power source 80 may include a battery. The power source 80 is configured to supply power to one or more components in the assembly 50 including the control unit 70, the input module 72 and the actuator 54. The fastener assembly 50 may be associated with the input module 72, which may serves as an interface between the user and the fastener assembly 50. In an embodiment of the present disclosure, the input module 72 includes but not limited to a human machine interface [HMI] comprising one or more user input provisions such as but not limiting to switches, touch pads, and the like. The user may operate the input module 72 to provide inputs in the form of voice commands, text commands, touch commands and the like. The control unit 70, interfaced with the input module 72 may receive the user input and perform necessary actions to operate the fastener assembly 50. The control unit 70 monitors the net resistance value across the resistor module 58, and may provide an alert to the user on unfastened condition of the nut 60 relative to the stud 52, or regarding disassembled/assembled condition of the nut 60 with respect to the stud 52 through an indication module 74 associated with the control unit 70. In an embodiment, the indication module 74 may be audio unit, visual unit, and audio visual unit. The user, upon receiving alert signal, may provide appropriate inputs to the control unit 70 through the input module 72 to perform operations as desired by the user. In some embodiments, input module 72 and the resistor module 58 may be interfaced with the power source 80 directly, or through some connection medium and intermediate components.

Figure 5:
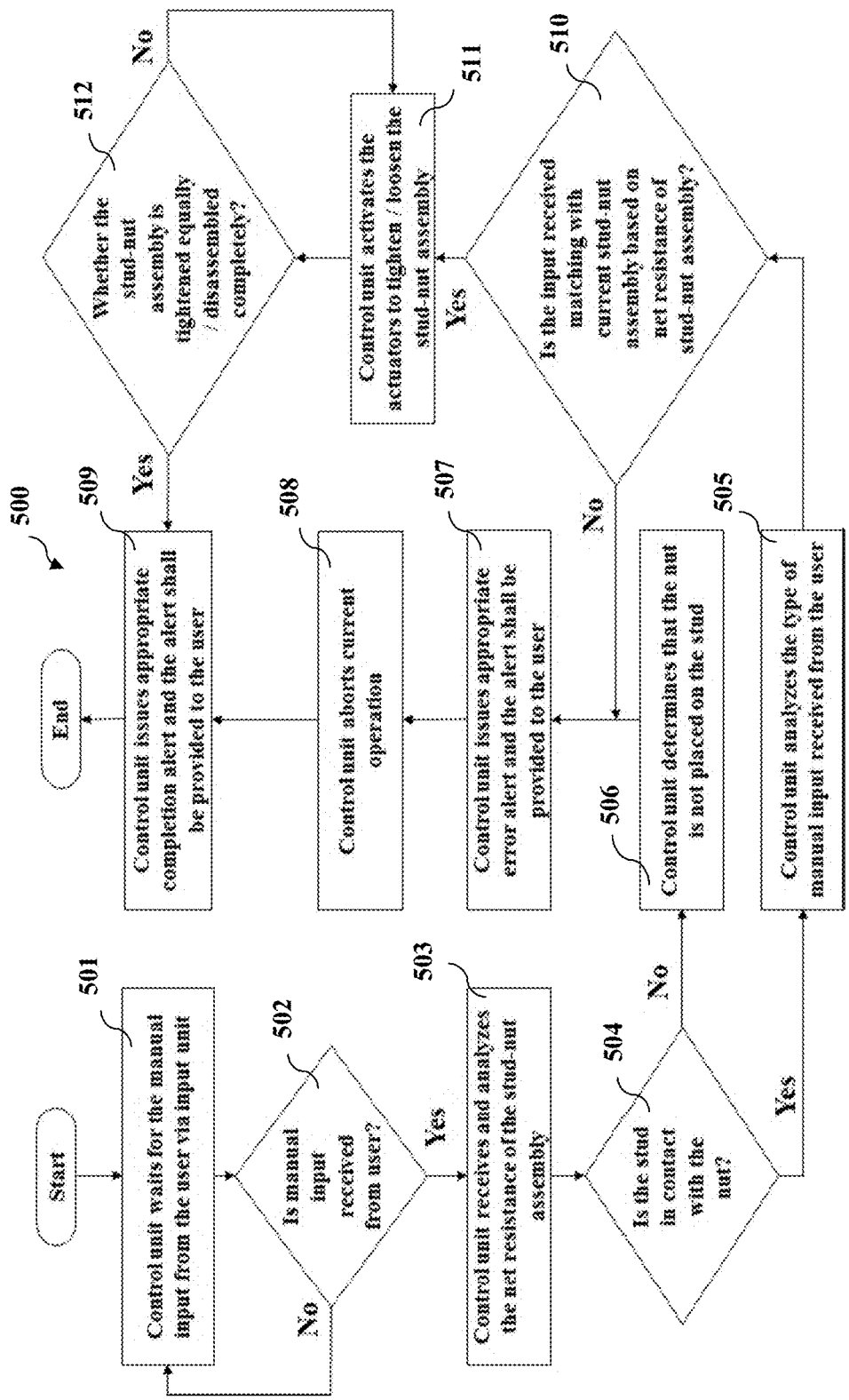
FIG. 5 illustrates a flowchart describing a method for assembling and disassembling the fastener assembly, in accordance with some embodiments of the present disclosure.

FIG. 5 illustrates a flowchart describing a method of operation of the fastener assembly 50, in accordance with some embodiments of the present disclosure. The method 500 discloses automatic assembling and disassembling of fastener assembly 50 based on user input through the input module 72. The terms assembling and disassembling used herein above and below refers to condition where the stud 52 is attached and detached respectively with respect to the nut 60.

As illustrated in FIG. 5, the user input may be provided (either to assemble or disassemble) to the fastener assembly 50 [alternatively referred to as "stud-nut assembly" in this context] through an input module 72 associated with the control unit 70. Upon receiving the user input [steps 501-502], the control unit 70 may receive and analyze the net resistance across the resistor module 58 configured in the stud-nut assembly 50, as shown in step 503. In an exemplary configuration, the minimum net resistance may be 50 ohms and maximum net resistance may be 1000 ohms. If the net resistance is found too high [i.e. greater than maximum net resistance corresponding to free end 52D position of the nut 60], it indicates that the nut 60 is not in contact with the stud 52 [steps 504 and 506]. This means the stud 52 is in disassembled state with respect to the nut 60, and the user has not placed the nut 60 on the shank 52B of the stud 52. Then the user shall be provided with appropriate alert as indicated by step 507 through an indication module 74 [shown in FIG. 4], and current operation shall be aborted 508. The user is expected to place the nut 60 on the stud 52, prior to giving an input for assembling the fastener assembly 50.

As shown in step 505, if the nut 60 is found placed on the stud 52 on receiving an input from the user, then the control unit 70 analyzes the net resistance across the resistor module 58 [step 510] of the stud-nut assembly to determine the state of the fastener assembly 50, i.e. whether the fastener assembly 50 is in assembled state or disassembled state. Maximum the net resistance, the fastener assembly 52 may be considered to be in disassembled state and minimum the net resistance, the fastener assembly 50 may be considered to be in assembled state. Once the state is determined, the control unit 70 validates the input given by the user. If the user gives an input to assemble the fastener assembly 50 while the nut 60 is already found assembled with the stud 52, then it is an indication of a wrong input. Similarly, if the user gives input for disassembling the fastener assembly while the nut 60 is already found disassembled from the stud 52, that too is a wrong input. The user shall be alerted about such wrong inputs [step 507] through the indication module 74 and current operation shall be aborted.

If the user input is validated and found correct while the nut 60 is placed on the stud 52, then the control unit 70 may activate the actuators 54 [step 511] to tighten or loosen the stud 52 relative to the nut 60, thus assembling or disassembling the nut 60 to or from the stud 52. During the operation, the control unit 70 keeps analyzing the net resistance across the resistor module 58 of the stud-nut assembly and regulates the actuator 54 automatically once the respective operation is completed. In an embodiment, the assembling operation shall be considered as complete once the net resistance of the stud-nut across the resistor module 58 of the assembly 50 has reached the possible minimum resistance, as shown in step 512. The disassembling operation shall be considered as complete once the net resistance across the resistor module 58 of the stud-nut assembly has reached the highest resistance i.e. greater than maximum net resistance corresponding to free end 52D position of the nut 60, as indicated in step 512. The user shall be provided with appropriate alerts on completion of the operations.

Figure 6:
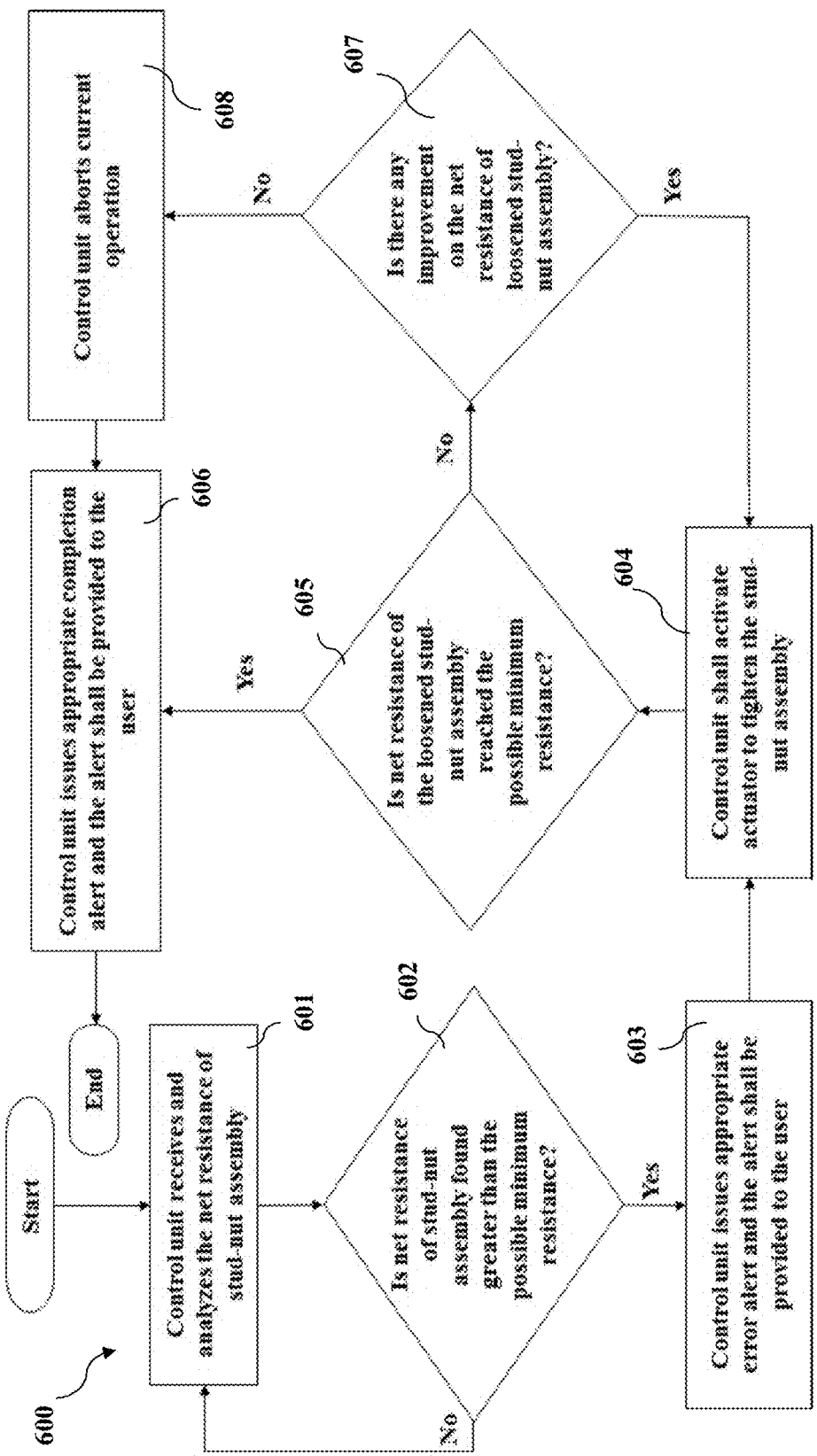
FIG. 6 illustrates a flowchart describing a method to vary position of the nut relative to the stud based on variation in net resistance, in accordance with some embodiments of the present disclosure.

FIG. 6 illustrates a flowchart describing a method 600 to vary position of the nut 60 relative to the stud 52 based on variation in net resistance, in accordance with some embodiments of the present disclosure. Variation of position of nut 60 relative to stud 52 may refer to a condition where the stud 52 is over tightened or loosened with respect to the nut 60 during operation.

As illustrated in FIG. 6, the control unit 70 may be configured to monitor the net resistance across the resistor module 58 of the stud-nut assembly 50, as per step 601. If the net resistance of the stud-nut assembly 50 is found greater than the supposed minimum resistance [step 602], that means the stud-nut assembly 50 is in loosened or un-torqued condition. In alternate terms, the nut 60 is not tight or fastened completely with respect to the stud 52. If such condition is detected [step 601], the control unit 70 may provide an alert signal to a user [step 603] through an indication module 74. The control unit 70 is also configured to automatically correct the variation. The control unit 70 may activate corresponding actuator 54 to tighten the loosened stud 52 [by rotation], with the nut 60 remaining fixed, as indicated in step 604. The control unit 70 again keeps checking the net resistance of the stud-nut assembly 50, and continues to operate the actuator 54 till the net resistance reaches the supposed minimum resistance [step 605]. If the net resistance has no improvement after activating the actuator 54 [step 607], then the correction may be failed [step 608]. In both the cases the user shall be provided with appropriate alerts as indicated in step 606. In an embodiment of the present disclosure, the indication module 74 includes but not limited to display, audio commands, visual commands or a combination of audio-visual commands, among other forms of indication modules.

Figure 7:
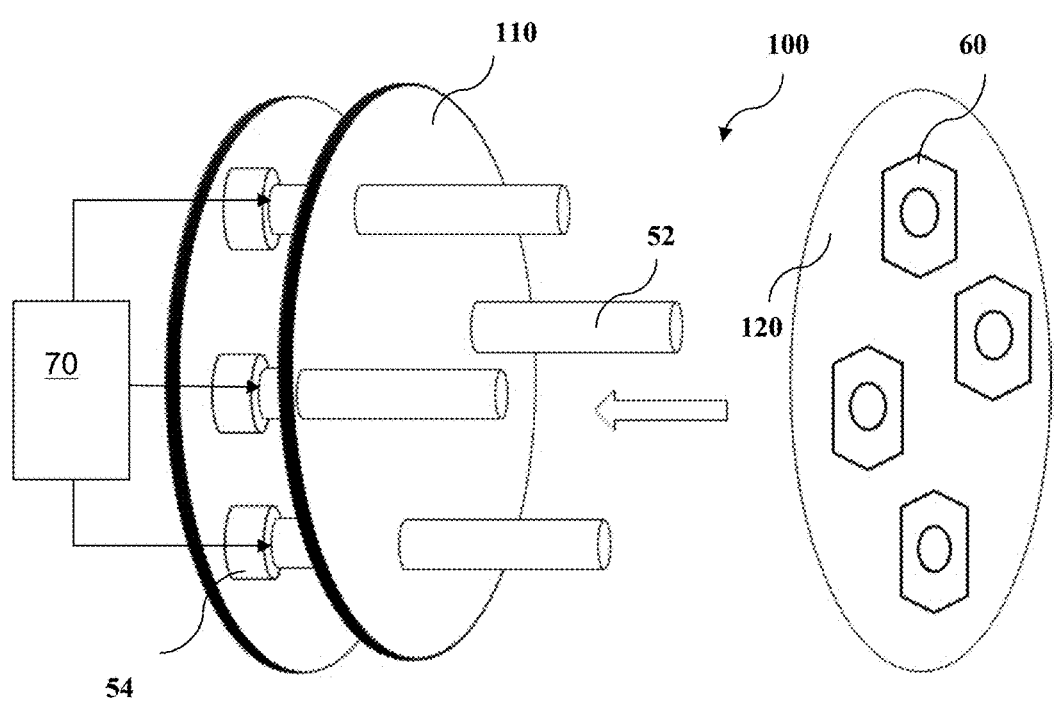
FIG. 7 illustrates a schematic perspective view of a wheel hub assembly of a vehicle provided with the fastener assembly of FIG. 1 or FIG. 2, in accordance with some embodiments of the present disclosure.

Reference is now made to FIG. 7 which illustrates wheel hub assembly 100 of a vehicle [not shown] comprising the fastener assembly 50 of FIG. 1 or FIG. 2, in accordance with some embodiments of the present disclosure. The fasteners assembly 50 described in above paragraphs may be implemented on a vehicle wheel assembly 100, where the fastener assembly 50 allows a wheel rim 120 to be automatically assembled onto a wheel hub 110. The fastener assembly 50 also facilitates vehicle wheel hub assembly 100 to be automatically provided with equal tightness/torque between all the studs 52 and the nuts 60. The fastener assembly 50, therefore, is capable of correcting loosening of the nuts 60 relative to the studs 52, which may occur during continuous propulsion of the vehicle on road.

As shown in FIG. 7, the vehicle wheel hub 110 is provided with actuators 54 which may be fixed or removably attached to it. The actuators 54 in turn are interfaced with the control unit 70. Further, the studs 52 of the fastener assembly 50 may be the extensions of the actuator 54 shafts 54A. In an embodiment of the present disclosure, the shaft 54A of the actuator 54 may be coupled to the stud 52 through a gear drive [not shown] to provide variable torque to the studs 52. In another embodiment, the actuator 54 is a motor. The nuts 60 which are to be tightened or fastened to the stud 52 may be provided in the wheel rim 120, and shall be fixed with respect to the wheel rim 120. Hence, the nuts 60 shall be stationary with respective to the removable wheel rim 120. The actuators 54 shall be operated by the control unit 70 to tighten or loosen the studs 52 and nuts 60 together, thereby assembling or disassembling the wheel rim 120 with the wheel hub 110. To accomplish fastening, the studs 52 which extend from the actuator 54 shafts 54A may be rotated, which thereafter, get tightened to the nuts 60 fixed on the removable wheel rim 120. The methodology described with reference to FIGS. 5 and 6 may be implemented for automatic assembling/disassembling of wheel rim 120 onto the wheel hub 110, and also for checking torqued/un-torqued condition of the nut 60 relative to the stud 52 based on determination of net resistance values.

In an embodiment of the present disclosure, resistor module 58 and insulating material 56 may be provided in each stud 52 in a manner where the net resistance is proportional to the position/tightness of the nut 60 on the respective stud 52. The net resistance across the resistor module 58 may be considered to be less when the nut 60 is in fully tightened condition, and the net resistance across the resistor module 58 may considered to be maximum when the nut 60 is in fully loosened condition. The control unit 70 may receive and analyze the resistance information from the resistor module 58 to determine the tightness of each of nut 60 relative to stud 52. During the automatic assembly process, the control unit 70 operates the actuators 54 till the net resistance of all the stud-nut assemblies 50 reach minimum equal level, hence ensuring equal tightness of all the nuts 60 relative to the respective studs 52. Whenever there is an increase in resistance of the resistor module 58 above the minimum or least resistance value, an un-torqued condition or loosened condition of nut 60 relative to the stud 52 is detected. Accordingly, the control unit 70 actuates the stud 52 to fasten the stud 52 relative to the nut 60, until the net resistance across the resistor module 58 reaches minimum or least value. This automatic correction or fastening of stud 52 relative to the nut 60 based on identification of variation in resistance fixes the concerns associated with loosening of the nut 60 relative to the stud 52.

In an embodiment of the present disclosure, the nut 60 may be fastened onto the shank 52B of the stud 52 by applying torque by means, including but not limited to hand-held tools and power tools. For fastening, the nut 60 may be placed at free end 52D of the stud 52, and torque may be applied on nut 60 to drive the nut 60 towards the head portion 52A of the stud 60. Similarly, for unfastening the nut 60, torque is to be applied in opposite direction, when the nut 60 gets displaced away from the head portion 52A of the stud 52.

In an embodiment of the disclosure, the control unit 70 may be an electronic control unit of the vehicle or may be an external control unit. The control unit 70 may include a processing unit which may include specialized processing units such as integrated system (bus) controllers, memory management control units, floating point units, graphics processing units, digital signal processing units, etc. The processing unit may include a microprocessor, such as AMD Athlon, Duron or Opteron, ARM's application, embedded or secure processors, IBM PowerPC, Intel's Core, Itanium, Xeon, Celeron or other line of processors, etc. The processing unit may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

[In some embodiments, the processing unit may be disposed in communication with one or more memory devices (e.g., RAM, ROM etc.) via a storage interface. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computing system interface (SCSI), etc. The memory drives may further include a drum, magnetic disc drive, magneto-optical drive, optical drive, redundant array of independent discs (RAID), solid-state memory devices, solid-state drives, etc.

In some embodiments, the memory unit may store data as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computing units discussed above in this disclosure. It is to be understood that the structure and operation of the any computer or database component may be combined, consolidated, or distributed in any working combination.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

In an aspect of the disclosure, the fastener assembly 50 disclosed in embodiments of the present disclosure may be implemented for connecting or fixing or securing two or more components, sub-assemblies, members, structures, elements or materials. These may include industrial couplings like flexible couplings, rigid couplings and torsionally rigid couplings among other forms of industrial couplings. Another implementation would be in the field of power transmission, such as shaft and hub couplings for turbines, pumps, motors and compressors. A still another implementation of the fastener assembly 50 of the present disclosure would be in the field of sealing arrangements of fluid systems, like fluid seals and vacuum seals. In the field of automobile engineering, the fastener assembly 50 of the present disclosure may be implemented in coupling of flanges, hydraulic couplings, actuators, rotary assemblies, transmission/drive trains and the like.

Advantages of the Embodiments of the Present Disclosure are Illustrated Herein:

In an embodiment, the present disclosure provides a fastener assembly in which a stud may be automatically fastened/tightened relative to a nut, without the need of manual inspection or intervention.

In an embodiment, the fastener assembly may be implemented in a vehicle wheel hub assembly, where wheel position is continuously monitored relative to wheel hub. This ensures accurate alignment between the wheel rim and the hub, at the same time prevents dis-assembling of the wheel rim from the wheel hub.

In an embodiment, the present disclosure provides a method for providing a real-time notification to the user regarding unfastening of the nut from the stud.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A fastener assembly, comprising:
   a stud comprising a head portion connectable to an actuator and a shank extending from the head portion, wherein at least a portion of the shank comprises one or more threads;
   an insulating material extending on the threads; and
   one or more resistors, wherein one end of one or more of the resistors is connectable to a power source and another end of the one or more of the resistors is connectable to the power source through a nut engageable with one or more of the threads, movement of the stud relative to the nut varies net resistance across the resistors, the stud further comprises one or more casings accommodating at least a portion of a circumference of the shank on the insulating material, and the resistors are disposed between the insulating material and at least one of the casings.

2. The assembly as claimed in claim 1, wherein the threads extend from a free end of the shank towards the head portion of the stud.

3. The assembly as claimed in claim 1, wherein the actuator is a motor.

4. The assembly as claimed in claim 1, wherein the nut is configured to be fixed and the head portion of the stud is rotatable by the actuator to perform at least one of fastening and unfastening of the stud with the nut.

5. The assembly as claimed in claim 1, wherein the net resistance across the resistors is configured to be maximum at a free end of the shank and decreases along a length of the at least a portion of the shank from the free end towards the head portion of the stud.

6. The assembly as claimed in claim 1 comprises a control unit interfaced with the resistors and the actuator.

7. The assembly as claimed in claim 6, wherein the control unit is configured to receive a user input corresponding to at least one of fastening and unfastening from an input module and operate the actuator to rotate the stud relative to the nut.

8. The assembly as claimed in claim 6, wherein the control unit is further configured to detect variation in the net resistance across the resistor module to identify position of the nut on the shank.

9. The assembly as claimed in claim 6, wherein the control unit operates the actuator to rotate the stud to vary position of the nut on the shank based on the net resistance across the resistors.

10. The assembly as claimed in claim 1, wherein a predefined position of the nut on the shank is set by the user.

11. The assembly as claimed in claim 1, wherein the resistors comprise a plurality of resistors in series.

12. The assembly as claimed in claim 1, wherein the nut comprises another one or more threads comprising conducting material engageable with the threads of the at least a portion of the shank.

13. The assembly as claimed in claim 1, wherein one or more of the casings comprise an additional one or more threads corresponding to the threads of the at least a portion of the shank.

14. A wheel hub of a vehicle comprising a fastener assembly as claimed in claim 1.

* * * * *